(12) United States Patent
Ciubotariu et al.

(10) Patent No.: US 11,372,811 B1
(45) Date of Patent: Jun. 28, 2022

(54) OPTIMIZING DISK VOLUME SCANNING USING SNAPSHOT METADATA

(71) Applicant: Amazon Technologies, Inc., Seattle, WA (US)

(72) Inventors: Mircea Ciubotariu, Culver City, CA (US); Sandeep Kumar, Sammamish, WA (US); Shlomo Yehezkel, Sherman Oaks, CA (US); Chakravarthi Kalyana Valicherla, Redmond, WA (US); Tal Eidelman, Seattle, WA (US); Shane Pereira, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/836,203

(22) Filed: Mar. 31, 2020

(51) Int. Cl.
*G06F 16/11* (2019.01)
*G06F 16/17* (2019.01)
*G06F 21/56* (2013.01)
*G06F 16/13* (2019.01)
*G06F 16/182* (2019.01)

(52) U.S. Cl.
CPC .......... *G06F 16/128* (2019.01); *G06F 16/134* (2019.01); *G06F 16/1734* (2019.01); *G06F 16/182* (2019.01); *G06F 21/565* (2013.01); *G06F 21/566* (2013.01)

(58) Field of Classification Search
CPC .... G06F 16/128; G06F 16/134; G06F 21/565; G06F 21/566; G06F 16/182; G06F 16/1734

USPC ........................................................ 707/649
See application file for complete search history.

(56) References Cited

U.S. PATENT DOCUMENTS

| | | | | |
|---|---|---|---|---|
| 7,818,299 B1* | 10/2010 | Federwisch | ............. | G06F 16/10 707/649 |
| 7,962,956 B1* | 6/2011 | Liao | ....................... | G06F 21/568 726/22 |
| 8,200,637 B1* | 6/2012 | Stringham | .......... | G06F 11/1451 707/670 |
| 8,220,053 B1* | 7/2012 | Sun | ....................... | G06F 21/562 726/24 |
| 8,990,164 B1* | 3/2015 | Mahajan | ............. | G06F 11/1451 707/649 |
| 9,152,638 B1* | 10/2015 | Naftel | .................... | G06F 16/188 |
| 9,268,689 B1* | 2/2016 | Chen | .................... | G06F 12/1027 |
| 9,483,644 B1* | 11/2016 | Paithane | ............... | G06F 21/566 |
| 9,665,582 B2* | 5/2017 | Wade | ....................... | G06F 16/13 |
| 10,079,842 B1* | 9/2018 | Brandwine | .......... | H04L 63/1441 |
| 10,148,675 B1* | 12/2018 | Brandwine | .......... | G06F 9/45558 |
| 10,289,493 B1* | 5/2019 | Miah | .................... | G06F 11/1446 |
| 10,635,810 B2* | 4/2020 | Piatt | ....................... | G06F 21/566 |
| 2003/0182313 A1* | 9/2003 | Federwisch | ............. | G06F 16/10 |

(Continued)

*Primary Examiner* — Phuong Thao Cao
(74) *Attorney, Agent, or Firm* — Nicholson De Vos Webster & Elliott LLP

(57) ABSTRACT

Techniques for optimizing disk volume scanning using snapshot metadata are described. A method of optimizing disk volume scanning using snapshot metadata may include determining, by a scanning service of a provider network, a plurality of changed blocks between a current snapshot of a storage volume in a storage service of the provider network and a reference snapshot of the storage volume, determining one or more files that overlap at least one of the plurality of changed blocks, and scanning the one or more files for threats.

20 Claims, 8 Drawing Sheets

(56) References Cited

U.S. PATENT DOCUMENTS

| | | | |
|---|---|---|---|
| 2009/0089880 A1* | 4/2009 | Kobayashi | G06F 21/56 |
| | | | 726/24 |
| 2011/0197279 A1* | 8/2011 | Ueoka | G06F 21/568 |
| | | | 726/24 |
| 2012/0059794 A1* | 3/2012 | Wade | G06F 16/188 |
| | | | 707/626 |
| 2013/0073819 A1* | 3/2013 | Havewala | G06F 11/004 |
| | | | 711/162 |
| 2013/0333042 A1* | 12/2013 | Saika | G06F 21/562 |
| | | | 726/24 |
| 2014/0149698 A1* | 5/2014 | Ezra | G06F 12/0864 |
| | | | 711/162 |
| 2015/0331905 A1* | 11/2015 | Brand | H04L 67/1095 |
| | | | 707/770 |
| 2016/0350322 A1* | 12/2016 | Fan | G06F 16/168 |
| 2017/0053118 A1* | 2/2017 | Malkov | G06F 21/56 |
| 2017/0353550 A1* | 12/2017 | Mutalik | H04L 67/1095 |
| 2019/0065322 A1* | 2/2019 | Chakankar | G06F 3/0619 |
| 2019/0235779 A1* | 8/2019 | Li | G06F 16/1847 |
| 2020/0186542 A1* | 6/2020 | Strogov | H04L 63/145 |
| 2021/0019404 A1* | 1/2021 | Strogov | G06F 11/1451 |
| 2021/0271563 A1* | 9/2021 | Appireddygari Venkataramana | G06F 3/067 |

* cited by examiner

400 — list_snapshot_block(snapshotID) //lists all of the blocks in a snapshot

402 — list_change_block(snapshotID, reference_snapshotID) //what blocks have changed between two snapshots 404 — file_to_block(list of blockIDs, snapshotID) //returns files that overlap a given block

*FIG. 4*

OPTIMIZING DISK VOLUME SCANNING USING SNAPSHOT METADATA

BACKGROUND

Threat scanning can be used to identify malicious software, such as computer viruses, on storage volumes. When scanning a storage volume for threats, the contents and metadata of each file on that volume need to be inspected to identify threats. This process is resource intensive, especially with multiple subsequent scans, between which only a small number of files have changed.

BRIEF DESCRIPTION OF DRAWINGS

Various embodiments in accordance with the present disclosure will be described with reference to the drawings, in which:

FIG. 4 is a diagram illustrating example application programming interfaces for optimizing disk volume scanning using snapshot metadata according to some embodiments.

DETAILED DESCRIPTION

The present disclosure relates to methods, apparatus, systems, and non-transitory computer-readable storage media for optimizing disk volume scanning using snapshot metadata. According to some embodiments, snapshot metadata can be used to identify ranges of the disk volume blocks that have changed since a previous snapshot. These ranges of change blocks can be compared to the locations of files stored on the volume. If the entire file does not overlap the changed ranges, it can be skipped from scanning Unlike filesystem metadata, like timestamps, which may be compromised by malicious software, snapshot metadata is maintained for the block level of the storage volume and cannot be modified by such malicious software. Accordingly, embodiments provide techniques for improving the efficiency of volume scanning by only scanning those files that have possibly changed, based on which blocks of the storage volume have changed since the last scan, without compromising the security of the scans.

Many provider networks enable customers to provision and use various types of computing resources including, for example, compute resources (for example, VMs, containers, and so forth) and data storage resources. These data storage resources can include directly attached, block-device storage available to customer compute instances, as well as network-accessible block storage volumes that can be used in a manner similar to use of local storage volumes, among other possible types of data storage. The use of network-accessible block storage volumes managed by a storage service can provide several benefits including, for example, high availability, high durability, automatic replication of volumes, and optional encryption of the data stored thereon.

Figure 1:
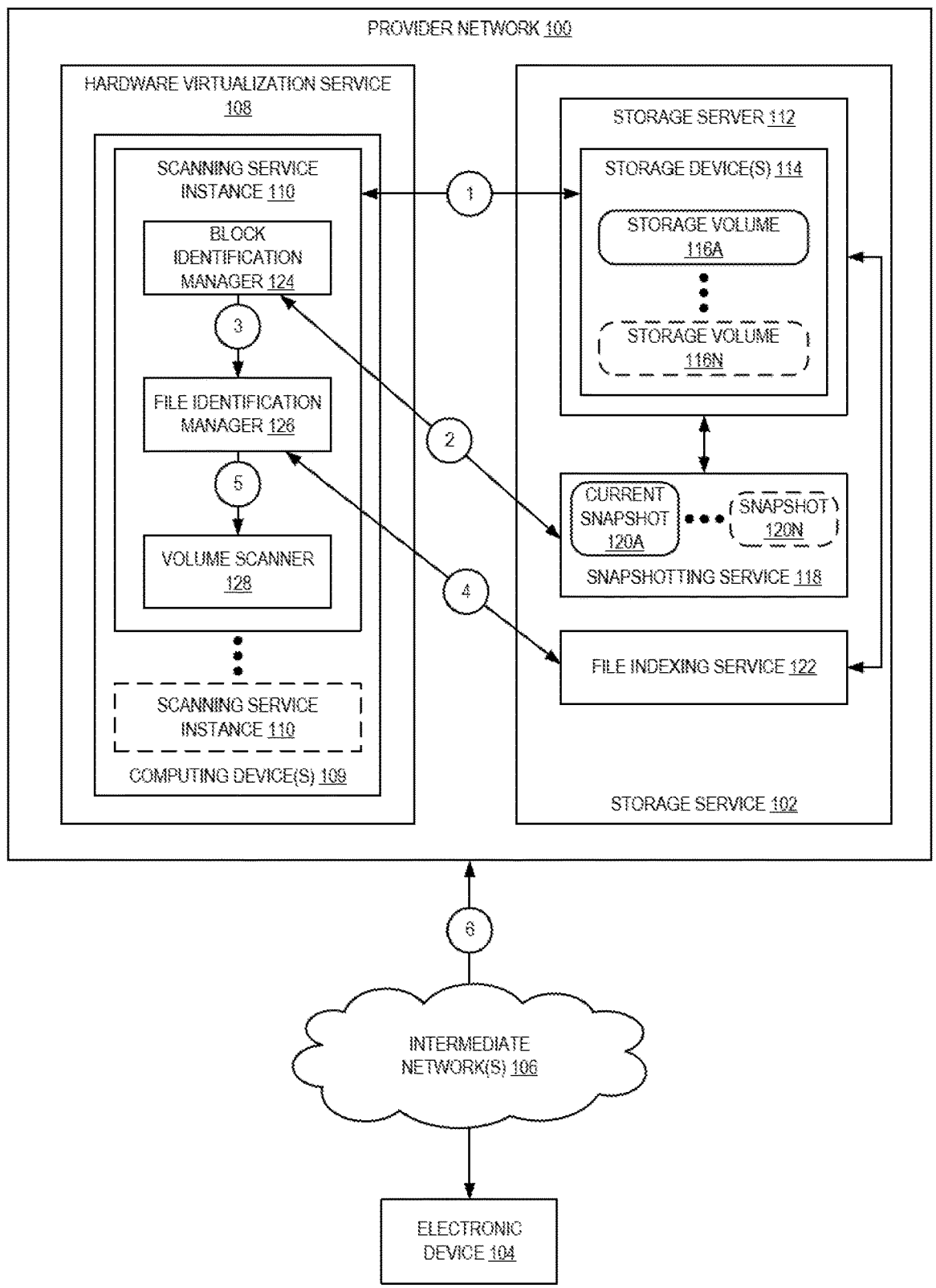
FIG. 1 is a diagram illustrating an environment for optimizing disk volume scanning using snapshot metadata according to some embodiments.

FIG. 1 is a diagram illustrating an environment for optimizing disk volume scanning using snapshot metadata according to some embodiments. A provider network 100 can include a storage service 102 that provides persistent block storage volumes (for example, storage volumes 116) for use with various types of compute instances and other computing resources in the provider network 100. In general, each storage volume can provide any amount of storage capacity depending on a customer's needs (for example, a provider network 100 may provide storage volumes ranging from 1 GB to 16 TB in size or any other range). Once a storage volume is created at a storage service 102, it can be attached to a compute instance (for example, a scanning service instance 110 hosted by a computing device 109 managed by a hardware virtualization service 108). Once a storage volume 116 is attached to a compute instance, the volume appears to the compute instance as a mounted device similar to any hard drive or other block device. At that point, a compute instance can interact with the volume just as it would with a local drive, formatting it with a file system or installing applications on it directly.

Typically, a storage volume 116 is attached to only one compute instance at a time, but many storage volumes 116 can be attached to a single compute instance. However, in some cases, a single storage volume 116 can be attached to two or more separate compute instances either permanently or temporarily (for example, during a process for migrating a compute instance from one computing device to another). In some embodiments, a storage volume 116 can be used as a boot partition for a compute instance 110, which enables users to preserve boot partition data beyond the life of a compute instance 110. In some embodiments, a single storage volume 116 can be stored as multiple partitions across two or more separate storage servers 112. In this case, a computing device 109 hosting a compute instance that attaches a storage volume 116 stored across multiple storage servers 112 can establish a separate connection with each of the respective storage servers and can manage I/O interactions with the storage volume for the compute instance. In the embodiment of FIG. 1, a scanning service instance 110 may be a compute instance that is configured with application(s), library(ies), or other software tool(s) to enable the scanning service instance to perform threat scanning on attached block storage volumes. This may include scanning for computer viruses, browser hijackers, ransomware, keyloggers, backdoors, spyware, hack tools, or other malware or greyware, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 104 may be part of, or serve as a front-end to, a control plane 102 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

The example shown in FIG. 1 includes several scanning service instances 110 managed by a hardware virtualization service 108, at least one of which has attached one or more storage volumes 116A-N managed by a storage service 102. As shown, each of the scanning service instances 110 can be hosted by a computing device 109 along with other scanning service instances or other compute instances on the same computing device, or a scanning service instance 110 can be the only compute instance hosted by a computing device. A storage server 112 can host any number of separate storage volumes 116A-N, which can be stored at any number of underlying storage devices 114 (for example, on hard disk drives (HDDs), solid-state drives (SSDs), or any other type of storage devices or combinations thereof). As indicated above, in some examples, a storage volume can also be stored across one or more separate storage servers 112.

In some embodiments, some or all of the computing devices 109 of the hardware virtualization service 108 include one or more of hardware processing elements, system memory, interconnects, one or more I/O proxy devices (each of which includes one or more separate hardware processing elements), and optionally one or more local data storage devices.

In an embodiment, a hardware processing element is generally any type of processor capable of executing instructions. For example, in various embodiments, a hardware processing element is a general-purpose or embedded processor implementing any of a variety of instruction set architectures (ISAs), such as the x86, ARM, PowerPC, SPARC, or MIPS ISAs, or any other suitable ISA. In multiprocessor systems, each of hardware processing elements may commonly, but not necessarily, implement the same ISA. In embodiments with multiple hardware processing elements, each processing element can have a dedicated bank of system memory or share system memory with other hardware processing elements. In some embodiments, a hardware processing element accesses system memory via a memory bus or via an interconnect. A hardware processing element can include one or more processor cores, each having one or more levels of dedicated or shared cache (for example, L1 cache, L2 cache, and so forth).

In an embodiment, system memory stores program instructions and other data accessible by hardware processing elements. In other embodiments, program instructions and/or data can be received, sent, or stored on different types of computer-accessible media. In various embodiments, system memory is implemented using any suitable computer-accessible storage medium. Generally speaking, a computer-accessible storage medium can include non-transitory storage media or memory media such as magnetic or optical media, for example, a disk or DVD/CD coupled to computer system via an interconnect. A non-transitory computer-accessible storage medium may also include any volatile or non-volatile media such as random-access memory (RAM) (for example, SDRAM, static RAM, dynamic RAM (DRAM), double data rate (DDR) SDRAM, and the like), read only memory (ROM), or other non-volatile memory (for example, Flash). Computer-accessible media may include transmission media or signals such as electrical, electromagnetic, or digital signals, conveyed via a communication medium such as a network and/or a wireless link, such as may be implemented via a network interface. In such cases, a computing device may access program instructions and data from a remote computer-accessible storage medium via the computer-accessible media.

In an embodiment, a computing device 109 optionally includes one or more network interfaces that allow data to be exchanged between the computing device and other electronic devices attached to a network or networks, such as other computing devices 109, storage servers 112, or any other hardware within a provider network 100 of which the computing device is a part, or with other computing devices external to the provider network. In some embodiments, a computing device 109 includes one or more I/O proxy devices, each including its own one or more network interfaces that may be separate from other network interfaces of the computing device 109. In various embodiments, a network interface of a computing device 109 or a network interface of an I/O proxy device supports communication via any suitable wired or wireless data network, such as Ethernet (for example, 802.3), 802.11, IP-based networks, Fiber Channel, Infiniband, and the like. These network interfaces may support communication via telecommunications/telephony networks such as analog voice networks or digital fiber communications networks any other suitable type of network and/or protocol.

In an embodiment, a computing device 109 includes interconnects which coordinate I/O traffic between components of the device, such as between hardware processing elements, memory, network interfaces, I/O proxy devices, and any other components that may be coupled to interconnects. Interconnects generally facilitate communication by a protocol that controls the timing, sequence, form, and content of data being exchanged among components. Example interconnects and protocols include QuickPath Interconnect (QPI), Peripheral Component Interconnect (PCI), Universal Serial Bus (USB), Small Computer System Interface (SCSI), Serial Attached SCSI (SAS), AT Attachment (ATA), Ethernet, variants or progeny of each, and the like. Multiple different interconnects may couple components of a computing device 109. For example, some components may be connected with an I2C bus, others with a PCI bus, and others with both the PCI bus and the I2C bus. In some embodiments, bridges relay communications between different types of interconnects (for example, from one device on a first interconnect, through a bridge, to another device on a second interconnect).

In some embodiments, the hardware processing elements of a computing device 109 can include one or more special purpose (SP) processors. In embodiments with multiple SP processors, each SP processor may have a dedicated bank of memory or may share memory with other SP processors. Each SP processor might be an accelerator, coprocessor, field-programmable gate array (FPGA), application-specific integrated circuit (ASIC), or other processing device that can perform specialized operations (for example, graphics rendering, encryption and decryption, and so forth). A computing device 109 can include one or more than one type of SP processor.

In some embodiments, a computing device 109 can include one or more local data storage devices. In some embodiments, local data storage devices provide block storage via one or more logical volumes to software executing on the computer system, including to one or more scanning service instances 110 that may be virtualized on a computing device 109. Hardware processing elements and/or other devices (for example, direct memory access (DMA) controllers, and so forth) can access local storage volume(s) to store and retrieve code and/or data. Local data storage devices generally include non-transitory computer-readable media, such as magnetic disks, optical disks, flash memory devices, phase-change memory devices, RAM, ROM, and the like.

In some embodiments, a computing device 109 can additionally or alternatively access one or more remote and network-accessible data storage devices (for example, storage device 114) via one or more networks. These remote, network-accessible data storage devices similarly can provide block storage via logical volumes (for example, storage volumes 116A-N) to software executing on the computing device 109, including to scanning service instances 110 running on the device. In some embodiments, the use of network-accessible data storage devices 114 is managed by a storage service 102 of a provider network 100. In some embodiments, a computing device 109 includes one or more other I/O devices that can store, process, and/or communicate code and/or data for the computing device.

A storage server 112 includes one or more storage volumes, each of which can be attached to an instance running on a computing device 109. For example, a compute instance can include one or more block device mappings, each corresponding to a storage volume 116A-N hosted by a storage server 112. In an embodiment, the block device mappings generally define the block storage devices that are attached to a compute instance. In some examples, block device mappings can be specified as part of an image used to launch a compute instance so that the block device mappings are used by any instances launched based on the image. Alternatively, block device mappings can be specified when a compute instance is launched or at any point after a compute instance is launched, thereby causing the compute instance to attach the block storage volumes specified by the block device mappings. As indicated above, once a storage volume 116A-N is attached to a compute instance via a block device mapping, the storage volume 116A-N can be mounted by the compute instance so that the compute instance can access the storage volume. A storage volume 116A-N can also be detached from a compute instance to which it is attached, at which point the compute instance can no longer access the storage volume.

In the example of FIG. 1, at numeral 1, storage volume(s) can be attached to a specialized compute instance, scanning service instance 110, which is configured with application(s), library(ies), or other software tool(s) to enable the scanning service instance to perform threat scanning on attached storage volumes 116A-N. The scanning service instance can scan the attached volume(s) for threats. In an embodiment, the process of attaching a storage volume 116A-N to a scanning service instance 110 involves creating a network-based communication channel between a computing device 109 hosting the scanning service instance 110 and a storage server 112 (or creating multiple connections if the volume is stored across multiple storage servers). This connection between a computing device 109 and a storage server 112 can be implemented in various ways, and can be based on a variety of different protocols (for example, the Transmission Control Protocol (TCP) or any other data exchange protocols). For example, at the computing device 109, the logic for handling such connections in some architectures is offloaded from the hardware exposed to the scanning service instances 110 and onto an "offload card". In this embodiment, software on an offload card can be responsible for both sending and receiving storage I/O traffic to/from storage servers 112, in addition to tasks like establishing and maintaining the network connections with the storage servers 112, identifying which of the various storage servers 112 is responsible for managing the storage volumes 116 (or portions of a storage volume) that are used by various scanning service instances 108 running on the computing device 109, among other operations. In other embodiments, the management of connections 118 between computing devices 106 and storage servers 112 can be implemented at the client-side by a hypervisor, for example, in a privileged "host domain" managed by the hypervisor, by individual scanning service instance 108, or by any other software or computing device system component.

In an embodiment, a storage service 102 generally includes a fleet of purpose-built storage servers. These storage servers similarly can comprise various hardware platforms (some of which, for example, may include one or more I/O proxy cards and other possible components described above in connection with computing devices) and are generally managed on servers that are independent of a hardware virtualization service 108 and other services. The management of the computing device-storage server connections similarly can be implemented at the server-side at I/O proxy cards, by hypervisors or other software running on the storage servers, or by other server components depending on particular hardware platforms used.

Storage service 102 may include a snapshotting service 118 which maintains point-in-time snapshots 120A-120N of storage volumes. A user, such as the owner or administrator of the storage volume(s), can choose to enable snapshotting of their storage volume(s) with the snapshotting service 118 of the storage service 102. In some embodiments, these snapshots may be stored in an object data store provided by storage service 102 and may be used to backup a storage volume at a particular point in time. Snapshots may be incremental backups, which means that only the blocks on the device that have changed after a most recent snapshot are saved. Each snapshot may include all of the information that is needed to restore a storage volume to the time when the snapshot was created. In some embodiments, when a snapshot is created it may be scanned by scanning service instance 110 to ensure it does not have any threats. Scanning for threats typically requires checking each file stored on a volume. This can be a resource intensive process, particularly for large storage volumes having large numbers of files. It also becomes redundant when only a small number of files have potentially changed between snapshots.

As such, scanning service instance 110 can include a block identification manager 124. Block identification manager 124 can send a request to snapshotting service 118, at numeral 2, to identify which blocks of the storage volume being scanned have changed between the current state of the volume (e.g., current snapshot 120A) and a reference snapshot (such as snapshot 120N). The reference snapshot may be the most recent snapshot taken prior to the current snapshot or may be the last snapshot that was scanned for threats or may be any previously scanned snapshot. In some embodiments, the request sent at numeral 2 may be an application programming interface (API) request which identifies the two snapshots to compare using snapshot identifiers. In response, the snapshotting service can return a list of block identifiers for blocks that have changed between the two snapshots.

At numeral 3, the block identifiers for the changed blocks can be provided to file identification manager 126. File identification manager 126 can send a request to file indexing service 122 to identify which files in the current snapshot 120A completely or partially overlap with a changed block, at numeral 4. If a file entirely overlaps with a changed block then that file has changed since the last snapshot, if a file partially overlaps with a changed block then it is possible that the file has changed since the last snapshot. Files that do not overlap with a changed block have not changed since the last snapshot and therefore do not need to be scanned for threats. Since many volumes do not change significantly between snapshots, focusing the threat scanning on only those files that have or might have changed significantly reduces the resources required to perform threat scanning In some embodiments, when a snapshot is mounted to the scanning service instance, file system metadata can be used to identify the files on the snapshot and to find the layout of each file on disk, making a separate file indexing service unnecessary. Once the file layout is determined based on the file system metadata then the file identification manager may determine which files overlap with a changed block, as discussed above.

In some embodiments, file indexing service 122 may maintain a data structure that indicates for each file in a snapshot, which block or blocks that file overlaps. For example, a map may be maintained in which each file name a is a key and the block identifiers for those blocks which the file overlaps are the values. Since a file may partially overlap a block, the same block identifier may be associated with multiple files in the data structure. In some embodiments, the request sent at numeral 4 may be an API request which includes the block identifiers for the changed blocks. In some embodiments, the request may identify the snapshot from which the files are to be identified, or if no snapshot is identified it may default to the current snapshot. In response, the file indexing service can provide the file names for those files that overlap completely or partially with the changed blocks.

At numeral 5, the list of files to be scanned can be provided to a volume scanner 128 which performs threat scanning of those listed files. In some embodiments, the metadata for each file in the list of files can be updated with a flag or other indication that it is to be scanned by the volume scanner. In such a case, the message at numeral 5 can be an instruction to begin the threat scan. The volume scanner then identifies the files to be scanned based on the flag in the file metadata. By only scanning files that have changed or may have changed, rather than the entire volume, the number of files to be scanned can be reduced by an order of magnitude. Additionally, because this is based on block level metadata rather than file system metadata, it is more secure, as the file system metadata can be compromised by malicious code while the block level metadata cannot. In some embodiments, after the volume has been scanned (e.g., the files that overlap with changed blocks have been scanned, as discussed above), a report is generated and provided to the customer at numeral 6.

In some embodiments, snapshots may be created at regular intervals (e.g., every X hours/Y days/etc.) and any time a new snapshot is created a threat scan is triggered. This way, only the files that overlap with portions of the storage volume that have changed between these regular scans need to be scanned for threats, reducing the amount of scanning to be performed. In some embodiments, if a file that overlaps with a changed block is very large, then it may be inefficient to scan the entire file for threats. In such an example, only portions of the file that are most likely to include malicious code (e.g., the beginning of the file, end of the file, or other portion of the file) may be scanned. In some embodiments, the portion of the file being scanned may be determined based on the file type of the file. In some embodiments, a file may be identified as overlapping with a changed block but may correspond to a file that has been moved on the storage volume, but which has not changed since a previous snapshot. In such an example, a hash (e.g., using an algorithm from the family of secure hash algorithms (SHA) or other hash algorithm) can be calculated for the file from the previous snapshot and a hash can be calculated for the file from the current snapshot. The resulting hashes can be compared and if they are the same, then the file can be ignored by the threat scanner because the file has not changed since it was last scanned. In some embodiments, the hash for each file may be obtained from metadata maintained by the file system. The hashes may be obtained and compared by the file identification manager.

Figure 2:
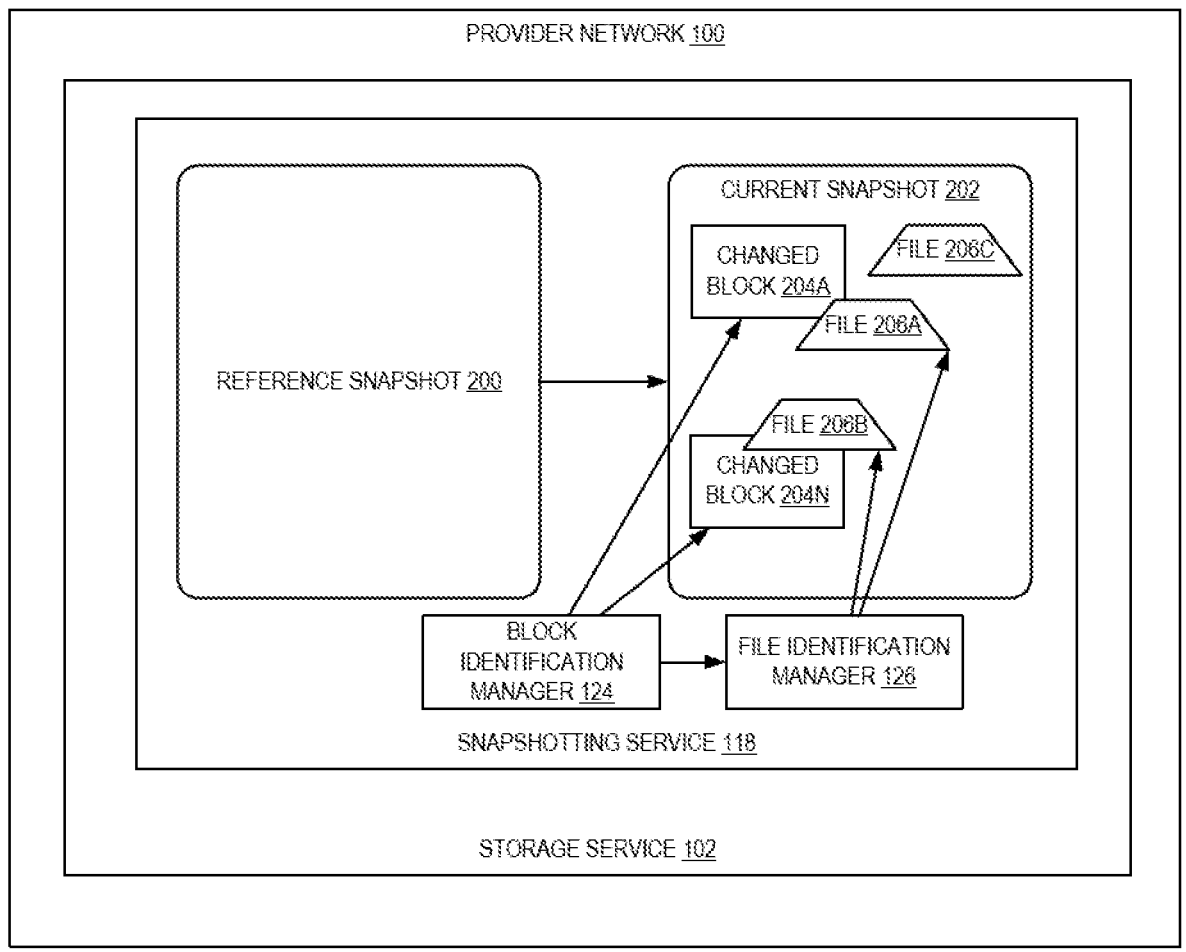
FIG. 2 is a diagram illustrating an example of identifying files that partially overlap changed blocks in a snapshot according to some embodiments.

FIG. 2 is a diagram illustrating an example of identifying files that partially overlap changed blocks in a snapshot according to some embodiments. As shown in FIG. 2, block identification manager 124 can request a list of changed blocks 204A-204N between a reference snapshot 200 and a current snapshot 202. As discussed, the reference snapshot may correspond to a snapshot of a storage volume for which a threat scan has been performed. In some embodiments, threat scanning may be performed periodically and may or may not be performed each time a new snapshot is created. Block identification manager can obtain a list of changed blocks 204A-204N each associated with a block identifier. The block identification manager can provide this list of changed blocks to file identification manager 126 which may then identify any files that overlap with any of these changed blocks. For example, file 206A partially overlaps with changed block 204A and file 206B partially overlaps with changed block 204N. Because these files partially overlap, it is possible that these files have changed and should be scanned for threats. However, many files in the current snapshot, such as file 206C do not overlap with any of the changed blocks. As such, file 206C has not changed since the last time it was scanned for threats and can be safely ignored on this next scan.

Figure 3:
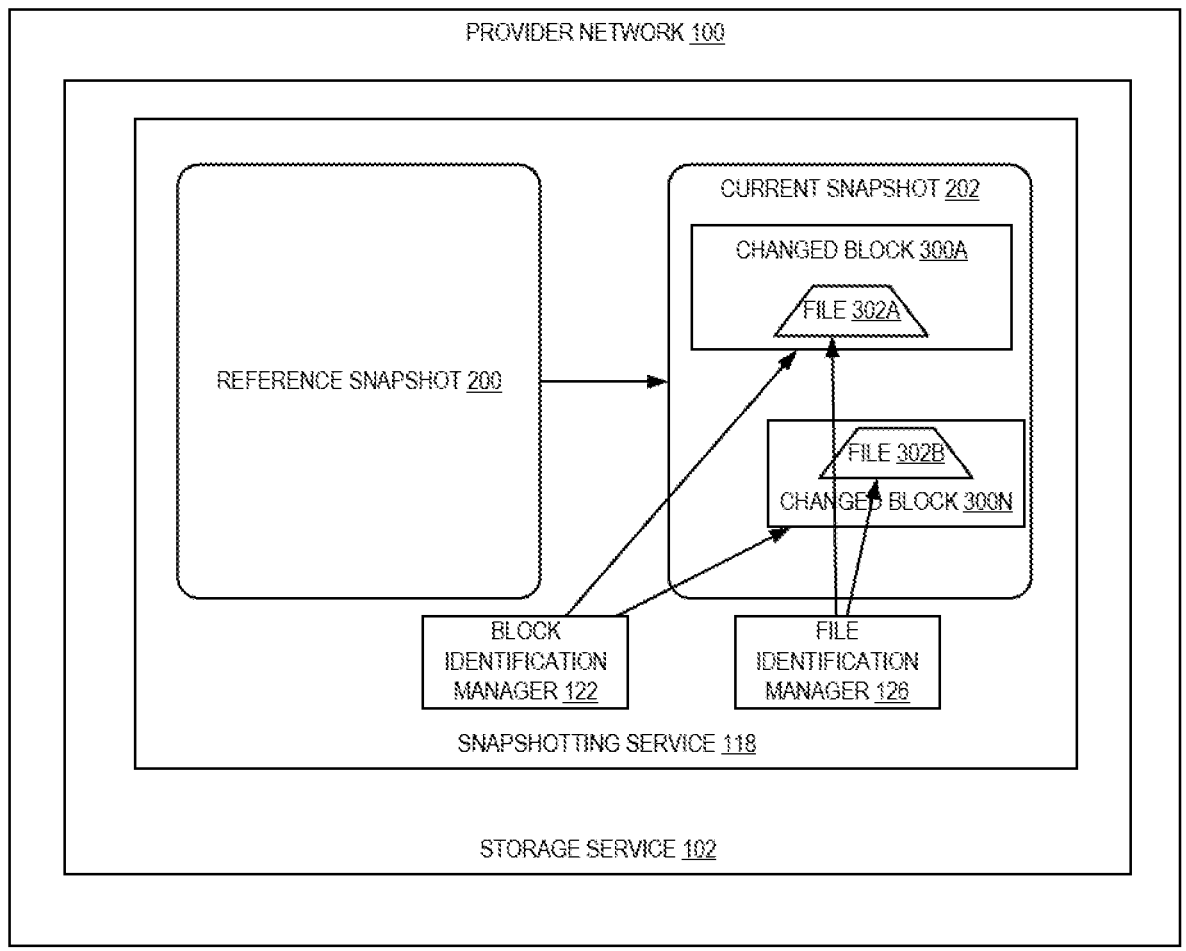
FIG. 3 is a diagram illustrating an example of identifying files that entirely overlap changed blocks in a snapshot according to some embodiments.

FIG. 3 is a diagram illustrating an example of identifying files that entirely overlap changed blocks in a snapshot according to some embodiments. As shown in FIG. 3, similar to FIG. 2, block identification manager 124 can request a list of changed blocks 300A-300N between a reference snapshot 200 and a current snapshot 202. Block identification manager can obtain a list of changed blocks 300A-300N each associated with a block identifier and provide this list of changed blocks to file identification manager 126. The file identification manager may then identify any files that overlap with any of these changed blocks. For example, file 302A completely overlaps with changed block 300A and file 302B completely overlaps with changed block 300N. Because these files completely overlap, these files have changed and should be scanned for threats. As discussed, any files that entirely or partially overlap with a changed block may have changed since the last time the volume was scanned for threats, as such scanning these files, and ignoring files that do not overlap with any changed blocks, can ensure the security of the volume while consuming significantly fewer resources to perform the scan.

FIG. 4 is a diagram illustrating example application programming interfaces (APIs) for optimizing disk volume scanning using snapshot metadata according to some embodiments. As shown in FIG. 4, an API may be provided that includes a list_snapshot_block command 400 which receives a snapshotID as an input and returns a list of all of the blocks in that snapshot. The API may further include a list_change_block command 402 which receives a snapshot ID for a current snapshot and a reference snapshotID for a reference snapshot as inputs and returns a list of blocks that have changed from the reference snapshot to the current snapshot. The API may further include a file_to_block command 404 which receives a list of blockIDs and a snapshotID, and returns the files that overlap with any of the blocks included in the list of blockIDs.

Figure 5:
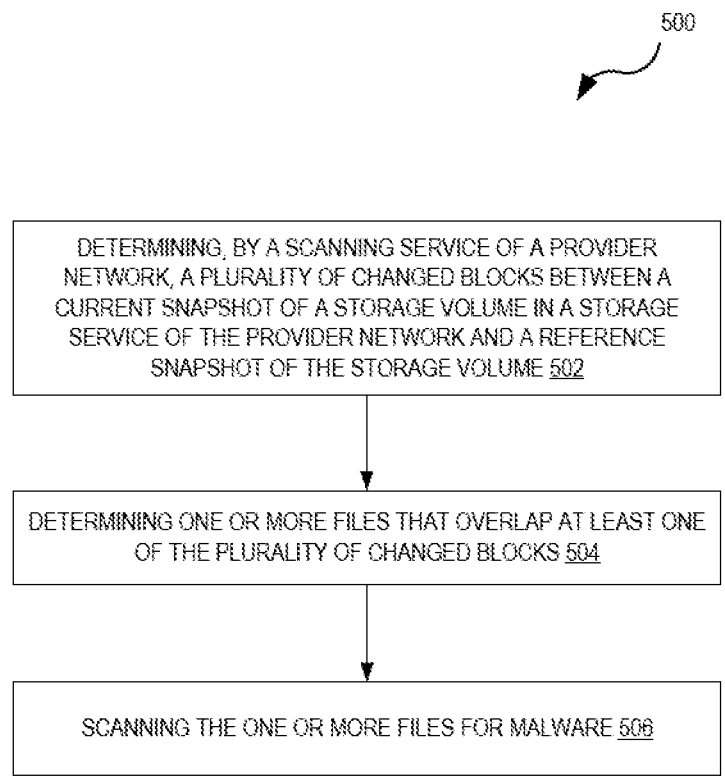
FIG. 5 is a flow diagram illustrating operations of a method for optimizing disk volume scanning using snapshot metadata according to some embodiments.

FIG. 5 is a flow diagram illustrating operations 500 of a method for optimizing disk volume scanning using snapshot metadata according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by storage service, scanning service, or file indexing service of the other figures.

The operations 500 include, at block 502, determining, by a scanning service of a provider network, a plurality of changed blocks between a current snapshot of a storage volume in a storage service of the provider network and a reference snapshot of the storage volume. In some embodiments, the plurality of changed blocks may be determined by sending a request to a snapshotting service of the storage service to identify the plurality of changed blocks, the request including at least a snapshot identifier for the reference snapshot, and receiving a plurality of block identifiers corresponding to the plurality of changed blocks of the current snapshot. In some embodiments, the reference snapshot is a most recent snapshot which was scanned for threats.

The operations 500 further include, at block 504, determining one or more files that overlap at least one of the plurality of changed blocks. In some embodiments, the one or more files may be determined by sending a request to a file indexing service of the storage service to identify the one or more files, the request including the plurality of changed blocks, and receiving a one or more file names corresponding to one or more files overlapping at least one of the plurality of changed blocks.

In some embodiments, the file indexing service includes a data structure mapping each file to one or more blocks of the storage volume. In some embodiments, the data structure mapping each file to one or more blocks of the storage volume is obtained when the storage volume is mounted to an instance of the scanning service. In some embodiments, the one or more files overlapping at least one of the plurality of changed blocks partially overlap at least one of the plurality of changed blocks or entirely overlaps at least one of the plurality of changed blocks.

The operations 500 further include, at block 506, scanning the one or more files for threats. In some embodiments, scanning the one or more files for threats may include identifying the one or more files to be scanned based on the file metadata associated with the one or more files, wherein the one or more files are a subset of files stored on the storage volume. In some embodiments, the operations may further include updating file metadata associated with the one or more files overlapping at least one of the plurality of changed blocks to indicate that the one or more files are to be scanned for threats.

Figure 6:
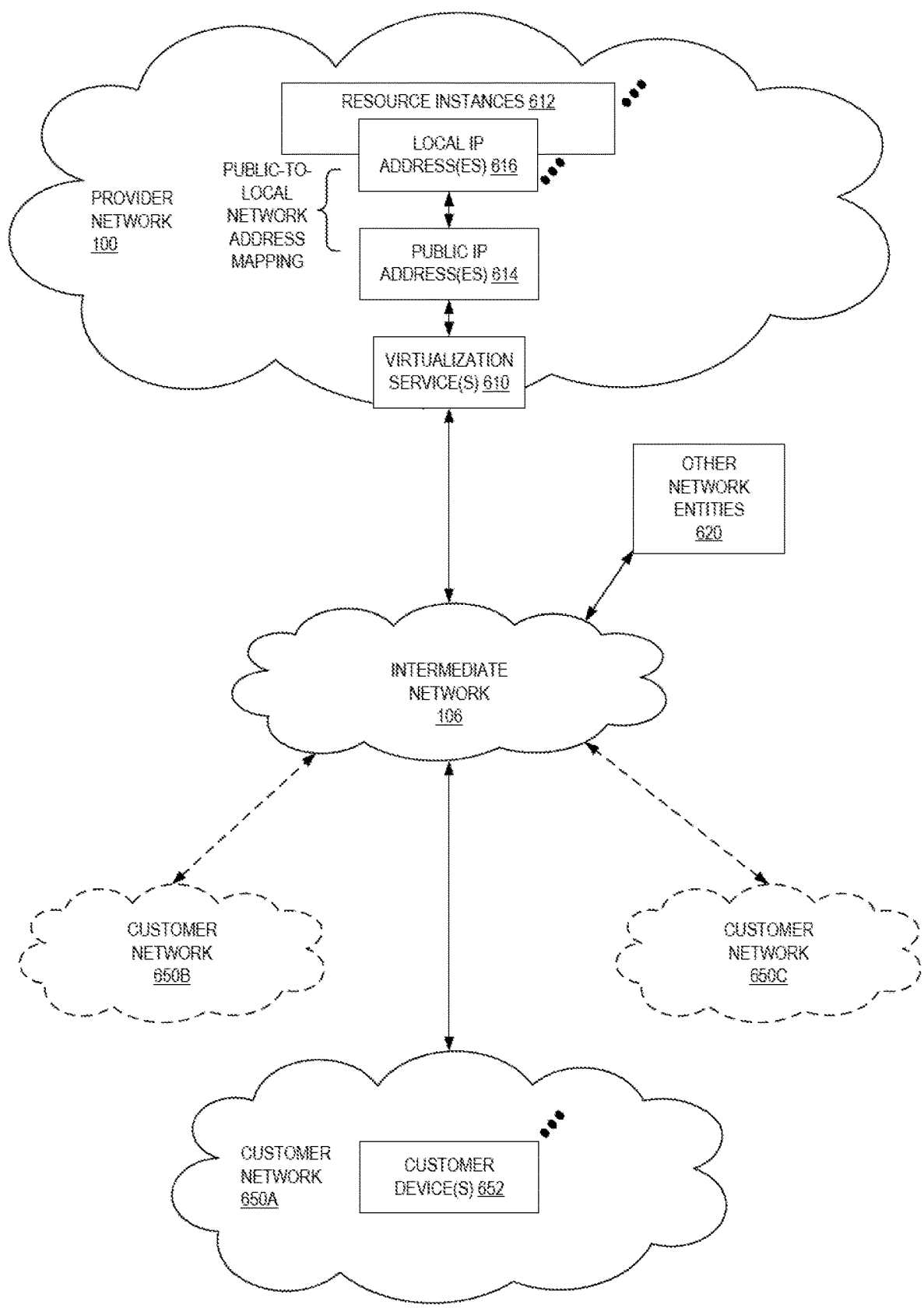
FIG. 6 illustrates an example provider network environment according to some embodiments.

FIG. 6 illustrates an example provider network (or "service provider system") environment according to some embodiments. A provider network 100 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 100. In some embodiments, the provider network 100 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 100, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 100 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 106, such as the Internet. Other network entities 620 on the intermediate network 106 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 106 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 100; a customer may then assign their allocated public IP addresses to particular resource instances allocated to the customer. These public IP addresses may be referred to as customer public IP addresses, or simply customer IP addresses. Instead of being assigned by the provider network 100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
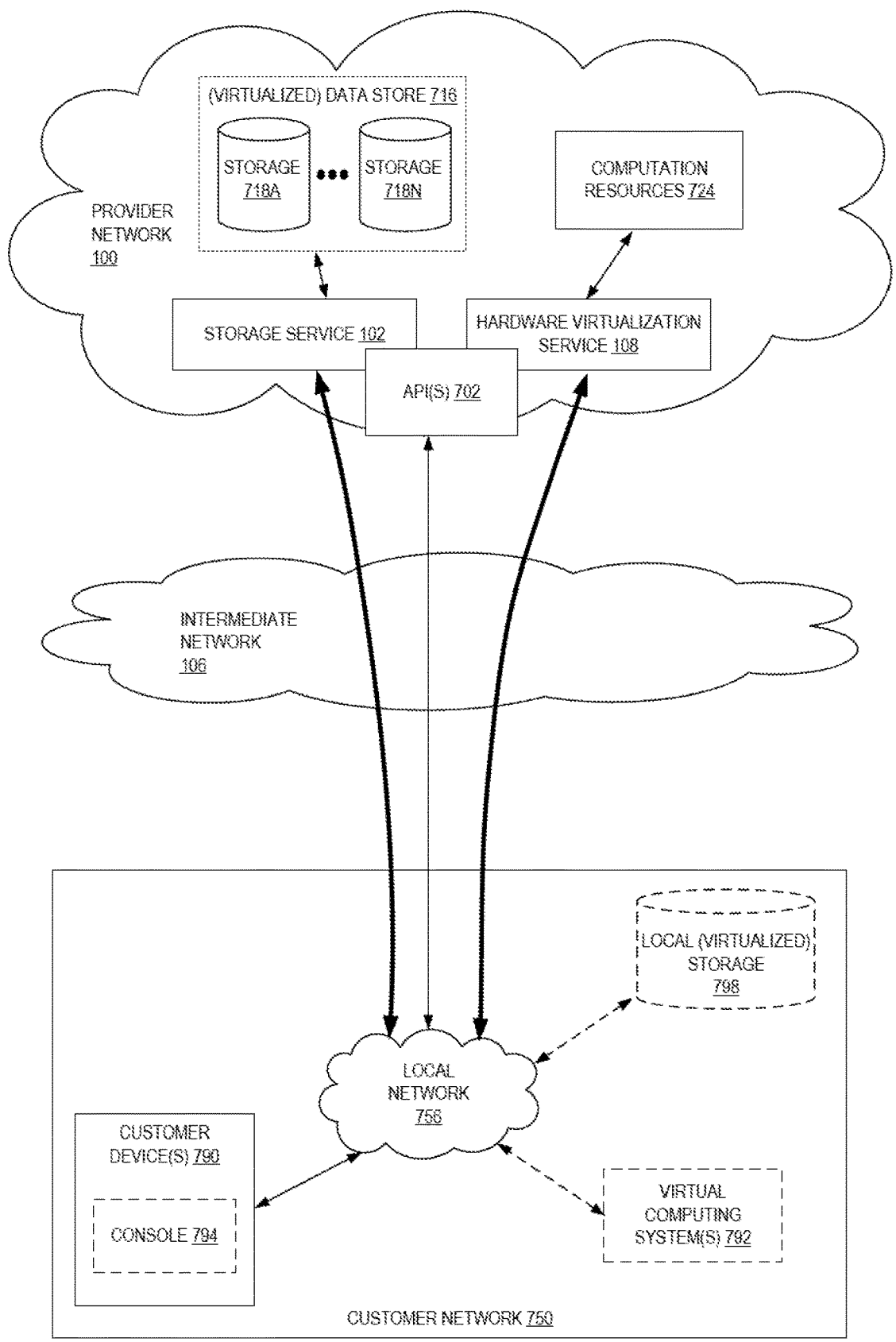
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 108 provides multiple computation resources 724 (e.g., VMs) to customers. The computation resources 724 may, for example, be rented or leased to customers of the provider network 100 (e.g., to a customer that implements customer network 750). Each computation resource 724 may be provided with one or more local IP addresses. Provider network 100 may be configured to route packets from the local IP addresses of the computation resources 724 to public Internet destinations, and from public Internet sources to the local IP addresses of computation resources 724.

Provider network 100 may provide a customer network 750, for example coupled to intermediate network 106 via local network 756, the ability to implement virtual computing systems 792 via hardware virtualization service 108 coupled to intermediate network 106 and to provider network 100. In some embodiments, hardware virtualization service 108 may provide one or more APIs 702, for example a web services interface, via which a customer network 750 may access functionality provided by the hardware virtualization service 108, for example via a console 794 (e.g., a web-based application, standalone application, mobile application, etc.). In some embodiments, at the provider network 100, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 102, for example via one or more APIs 702, to access data from and store data to storage resources 718A-718N of a virtual data store 716 (e.g., a folder or "bucket", a virtualized volume, a database, etc.) provided by the provider network 100. In some embodiments, a virtualized data store gateway (not shown) may be provided at the customer network 750 that may locally cache at least some data, for example frequently-accessed or critical data, and that may communicate with storage service 102 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 102 acting as a storage virtualization service, and these volumes may appear to the user as local (virtualized) storage 798.

While not shown in FIG. 7, the virtualization service(s) may also be accessed from resource instances within the provider network 100 via API(s) 702. For example, a customer, appliance service provider, or other entity may access a virtualization service from within a respective virtual network on the provider network 100 via an API 702 to request allocation of one or more resource instances within the virtual network or within another virtual network.

Illustrative Systems

Figure 8:
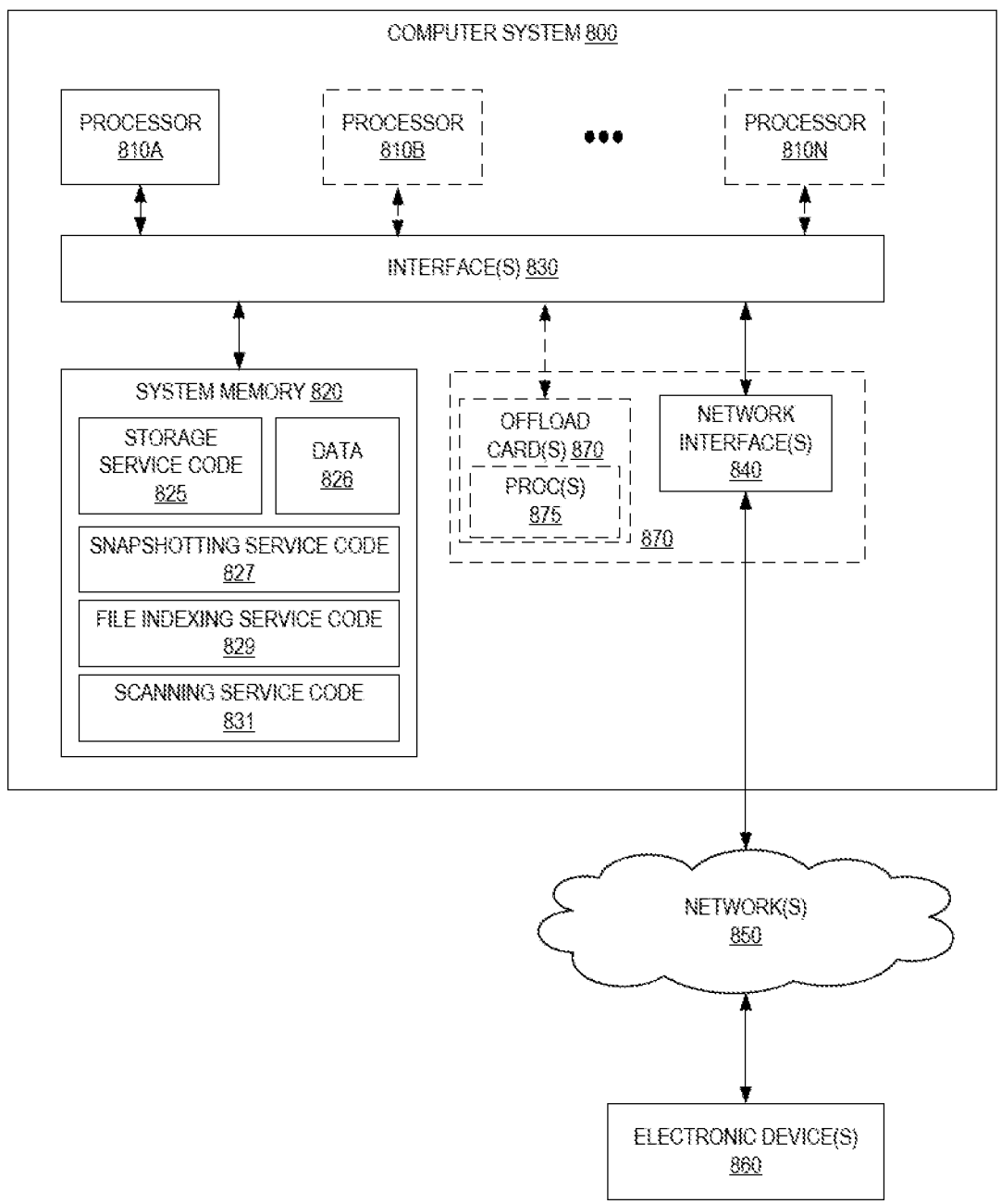
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as storage service code 825, snapshotting service code 827, file indexing service code 829, scanning service code 831, and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   generating a snapshot of a storage volume of a storage service in a provider network;
   scanning the snapshot of the storage volume by a scanning service of the provider network, wherein scanning the snapshot includes:
      sending a request to a snapshotting service for a plurality of changed blocks between the snapshot and a reference snapshot of the storage volume;
      determining one or more files that overlap at least one of the plurality of changed blocks;
      identifying at least one re-located file of the one or more files that has been moved on the storage volume;
      determining that a first hash of the at least one re-located file associated with the reference snapshot matches a second hash of the at least one re-located file associated with the snapshot;
      updating metadata associated with a remaining one or more files to indicate that the remaining one or more files are to be scanned for threats, wherein the remaining one or more files comprises the one or more files minus the at least one re-located file; and
      scanning only the remaining one or more files for threats.

2. The computer-implemented method of claim 1, wherein determining one or more files that overlap at least one of the plurality of changed blocks further comprises:
   sending a request to a file indexing service of the storage service to identify the one or more files, the request including the plurality of changed blocks; and
   receiving one or more file names corresponding to the one or more files overlapping at least one of the plurality of changed blocks.

3. The computer-implemented method of claim 1, wherein the one or more files overlapping at least one of the plurality of changed blocks partially overlap at least one of the plurality of changed blocks or entirely overlap at least one of the plurality of changed blocks.

4. A computer-implemented method comprising:
   determining, by a scanning service of a provider network, a plurality of changed blocks between a current snapshot of a storage volume in a storage service of the provider network and a reference snapshot of the storage volume;
   determining one or more files that overlap at least one of the plurality of changed blocks;
   identifying at least one re-located file of the one or more files that has been moved on the storage volume;
   determining that a first hash of the at least one re-located file associated with the reference snapshot matches a second hash of the at least one re-located file associated with the snapshot; and
   scanning a remaining one or more files for threats, wherein the remaining one or more files comprises the one or more files minus the at least one re-located file.

5. The computer-implemented method of claim 4, wherein determining, by a scanning service of a provider network, a plurality of changed blocks between a current snapshot of a storage volume in a storage service of the provider network and a reference snapshot of the storage volume further comprises:
   sending a request to a snapshotting service of the storage service to identify the plurality of changed blocks, the request including at least a snapshot identifier for the reference snapshot; and
   receiving a plurality of block identifiers corresponding to the plurality of changed blocks of the current snapshot.

6. The computer-implemented method of claim 4, wherein the reference snapshot is an earlier snapshot which was scanned for threats.

7. The computer-implemented method of claim 4, wherein determining one or more files that overlap at least one of the plurality of changed blocks further comprises:
   sending a request to a file indexing service of the storage service to identify the one or more files, the request including the plurality of changed blocks; and
   receiving one or more file names corresponding to the one or more files overlapping at least one of the plurality of changed blocks.

8. The computer-implemented method of claim 7, further comprising:
   updating file metadata associated with the remaining one or more files overlapping at least one of the plurality of changed blocks to indicate that the one or more files are to be scanned for threats.

9. The computer-implemented method of claim 8, wherein scanning the remaining one or more files for threats further comprises:
   identifying the remaining one or more files to be scanned based on the file metadata associated with the remaining one or more files, wherein the remaining one or more files are a subset of files stored on the storage volume.

10. The computer-implemented method of claim 7, wherein the file indexing service includes a data structure mapping each file to one or more blocks of the storage volume.

11. The computer-implemented method of claim 10, wherein the data structure mapping each file to one or more blocks of the storage volume is obtained when the storage volume is mounted to an instance of the scanning service.

12. The computer-implemented method of claim 11, wherein the one or more files overlapping at least one of the plurality of changed blocks partially overlap at least one of the plurality of changed blocks or entirely overlap at least one of the plurality of changed blocks.

13. A system comprising:
- a first set of one or more electronic devices to implement a storage service in a multi-tenant provider network; and
- a second set of one or more electronic devices to implement a scanning service in the multi-tenant provider network, the scanning service including instructions that upon execution cause the scanning service to:
  - determine a plurality of changed blocks between a current snapshot of a storage volume in the storage service and a reference snapshot of the storage volume;
  - determine one or more files that overlap at least one of the plurality of changed blocks;
  - identify at least one re-located file of the one or more files that has been moved on the storage volume;
  - determine that a first hash of the at least one re-located file associated with the reference snapshot matches a second hash of the at least one re-located file associated with the snapshot; and
  - scan a remaining one or more files for threats, wherein the remaining one or more files comprises the one or more files minus the at least one re-located file.

14. The system of claim 13, wherein the instructions to determine a plurality of changed blocks between a current snapshot of a storage volume in the storage service and a reference snapshot of the storage volume, when executed, further cause the scanning service to:
- send a request to a snapshotting service of the storage service to identify the plurality of changed blocks, the request including at least a snapshot identifier for the reference snapshot; and
- receive a plurality of block identifiers corresponding to the plurality of changed blocks of the current snapshot.

15. The system of claim 13, wherein the reference snapshot is an earlier snapshot which was scanned for threats.

16. The system of claim 13, wherein the instructions to determine one or more files that overlap at least one of the plurality of changed blocks, when executed, further cause the scanning service to:
- send a request to a file indexing service of the storage service to identify the one or more files, the request including the plurality of changed blocks; and
- receive one or more file names corresponding to the one or more files overlapping at least one of the plurality of changed blocks.

17. The system of claim 16, wherein the instructions, when executed, further cause the scanning service to:
- update file metadata associated with the remaining one or more files overlapping at least one of the plurality of changed blocks to indicate that the remaining one or more files are to be scanned for threats.

18. The system of claim 17, wherein the instructions to scan the remaining one or more files for threats, when executed, further cause the scanning service to:
- identify the remaining one or more files to be scanned based on the file metadata associated with the remaining one or more files, wherein the remaining one or more files are a subset of files stored on the storage volume.

19. The system of claim 16, wherein the file indexing service includes a data structure mapping each file to one or more blocks of the storage volume.

20. The system of claim 19, wherein the data structure mapping each file to one or more blocks of the storage volume is obtained when the storage volume is mounted to an instance of the scanning service.

\* \* \* \* \*